Patented Feb. 17, 1953

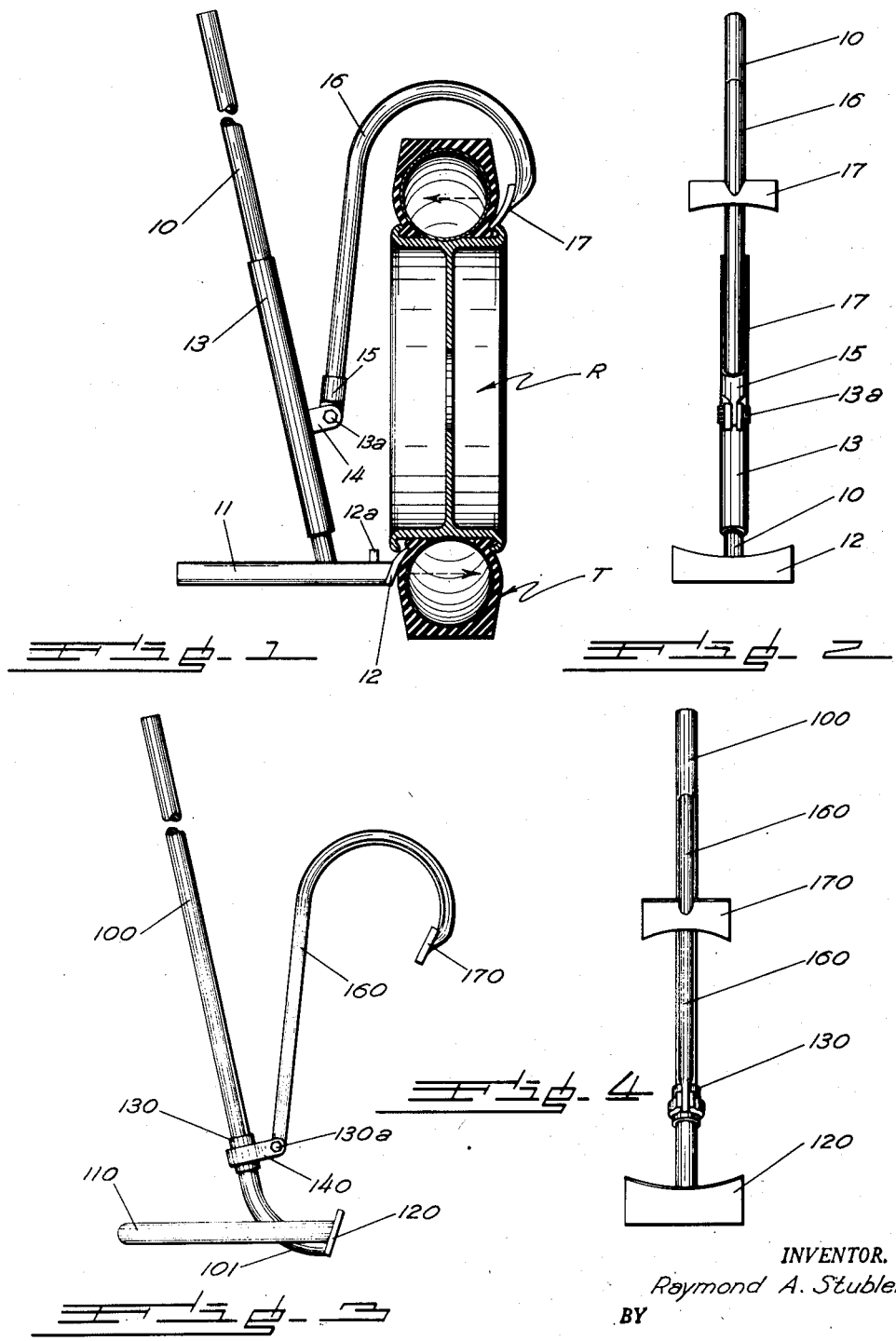

2,628,669

UNITED STATES PATENT OFFICE 2,628,669

PIVOTED TIRE BEAD LOOSENING TOOL WITH DIAMETRICALLY AND AXIALLY OPPOSED PRESSURE ELEMENTS

Raymond A. Stubler, Las Vegas, Nev.

Application December 26, 1947, Serial No. 793,841

4 Claims. (Cl. 157—1.28)

1

This invention relates to new and useful improvements in automotive accessories, and more particularly to a pneumatic tire removal tool.

An important object of the invention is to provide a tire removal tool which can be used to quickly loosen and remove a tire from its clincher rim or wheel, due to its being developed to simultaneously engage opposite side walls of the tire with an opposed two-way push-pull action, simultaneously along both walls of the tire casing.

Another object of the invention is to provide a tool of this character with which, leg power as well as arm power, is simultaneously applied to "break" the beads of the tire away from a rim.

A further object of the invention is to provide a strong, durable and inexpensively constructed tool, which is readily manufactured and folds into a compact arrangement for storage when not in use.

Other objects and advantages of the invention will be apparent during the course of the following description.

In the accompanying drawing, forming a part of the application and wherein like numerals are employed to designate like parts throughout the several views:

Fig. 1 is a side elevation of the tire tool shown in position for removing a tire from a rim.

Fig. 2 is a front elevation of the tool of Fig. 1.

Fig. 3 is a side elevation of a modified form of the invention; and

Fig. 4 is a front elevation of this modified form.

Referring to the drawing wherein, for the purpose of illustration, is shown two preferred embodiments of the invention, the numeral 10 designates a handle lever by which the tool is operated. The handle may be of any desired cross section, but is here shown as tubular and circular cross section. The lower end of the handle 10 may be extended as a foot piece at an obtuse angle, or may be suitably secured to an intermediate part of a base or foot piece 11 upon which the operator of the tool may press with his foot while loosening a pneumatic tire T from a wheel or rim R, here shown as of the clincher type. The end of the foot piece nearest the tire is equipped with a slightly arcuate toe 12, extending at an obtuse angle above the top of the foot piece, where the toe is slightly curved upwardly and outwardly thereof. A pin or the like, 12a may be provided to hold toe 12 to base 11. The upper edge of the toe 12 is concaved downwardly, as shown in Fig. 2, to facilitate its clearance of the rim R. In effect, the foot piece may be considered as an extension of the handle and the toe 12 may be secured to the handle as well, as is shown in Fig. 3.

Slidably mounted on the handle 10 is a tubular sleeve 13 just slightly larger in diameter than the handle, to slide freely thereon in its adaptation to various size tires. If desired, the cross-sections of the handle and sleeve may be correspondingly non-circular to preclude their relative rotation. Intermediate its ends, the sleeve 13 is provided with a pair of laterally extending ears 14, carrying a pivot pin or bolt 13a, which is removably passed through a swedged end of a socket 15, in which is removably secured, by threads or the like, one end of a lever arm 16. Thus, the lever arm is pivotally connected with the sleeve 13, and is also slidably mounted on the handle 10, by means of the sleeve. The free end of this lever arm is of claw, or semi-circular shape to terminate in an end to which a finger or plate 17, corresponding to the toe 12, is suitably secured. The finger 17, while being substantially identical with the toe 12, is secured to the lever inverted with respect to the toe, and is therefore, curved in a direction opposed to the curvature of the toe.

As is well appreciated, tires which have been on rims for some time, frequently "freeze" or stick thereto, so that when they are to be removed, must be struck sharply several times with a mallet or jumped upon to loosen the beads of the tire from the clincher rim, after which the repairman stands upon the side wall of the tire while prying one portion of the bead from under the clincher of the rim sufficiently to enter his fingers to pull the remainder of the bead up over the clincher flange. This is a menial and time-consuming job which no one relishes. With the tool of this application, it becomes a comparatively simple matter to remove a tire from its clincher rim.

To accomplish this, the repairman preferably places the tire in a rack or on the ground vertically, as shown in Fig. 1, and places the toe 12 of the tool against the lower portion of the side wall of the tire close to its bead, and the hooked lever arm 16 is swung over the top of the tire while the sleeve 13 is moved along the handle to assist in positioning the end of the finger 17, in engagement with the opposite side wall of the tire adjacent the top thereof and against the bead of the tire. With the operator's foot on the base 11, the tire is held upright and the operator grasps the upper end of the handle 10 and pulls it toward himself, fulcruming the toe 12 against the side wall and clincher flange, thereby applying a pushing action to the foot piece and toe 12 at the lower portion of the tire, and a pulling action to the lever 16 and finger 17, to the upper portion of the tire, as shown by the dotted arrows in Figure 1. Thus, the two beads of the tire are moved in opposite directions toward the circumferential center of the rim to free the beads from the clincher flanges of the rim. Thereafter, the tool is operated further in the same manner until the finger 17 causes the bead of the tire to clear the clincher flange and the lever 16 causes this bead to rise over said flange. With a portion of the tire side wall loosened or lifted over the clincher flange, the tire can then be easily demounted from the rim R.

A somewhat modified form of the invention is shown in Figures 3 and 4 for use on straight side wall tire casings, and the parts are virtually identical with those of Figures 1 and 2 with the exceptions noted hereinafter. The handle 100, is a solid round bar with its lower end curved at 101 and fastened to the center of a toe piece 120. The sleeve 130, slidable along the handle 100, is considerably shorter than the corresponding member 13 shown in Figure 1. The lever arm 160 is pivotally mounted on a removable pin or bolt, 130a, as in the preceding form of the invention. The toe plate 120, secured to the base or foot piece 110, and the finger plate 170, are flat instead of being curved as shown in Figures 1 and 2. The manipulation and action of this modified form of the invention is the same as described in connection with the form shown in Figures 1 and 2. It will be understood that various changes in the size, shape and relation of parts may be made within the scope of the invention.

What is claimed is:

1. A tire tool comprising an elongated handle lever having a foot piece at its lower end terminating in a toe for engagement with the side wall of a tire at one point thereof, a sleeve slidable upon said handle, and an arm pivotally connected to said sleeve and having an arcuate free end terminating in a relatively wide finger piece for engagement with the other side wall of said tire at a point diametrically opposite to the first-named point, said toe and finger piece being moved relatively in opposite directions as said handle fulcrums upon said toe.

2. A tire tool comprising a foot piece having one end adapted to engage a side wall of a tire casing, at one point thereof an elongated handle extending from an intermediate portion of said foot piece at an obtuse angle relative thereto, a sleeve slidable upon said handle, and an arm pivotally connected to said sleeve and having a claw for engagement with the other side wall of said tire casing at a point diametrically opposite the first-named point, and said foot piece and claw being moved by said handle in opposite directions to free said casing from a tire rim.

3. A tire tool comprising an elongated handle lever having its lower end arcuated, a foot piece adjacent said arcuated end, a toe secured to said arcuated end and foot piece and adapted to engage a side wall of a tire casing, a sleeve slidable along said handle and having a pair of lugs, an elongated arm pivotally connected at one end to said lugs and having its free end formed into a hook having a bight to receive the cross section of the tire casing, and a finger secured to said hooked end for engagement with the opposite side wall of the tire casing at a point diametrically opposite the points engaged by said toe and adapted to be moved in a direction opposed to the movement of said toe as said handle lever is moved outwardly of the tire casing and fulcrums on its lower arcuated end to simultaneously loosen both beads of said tire casing from its rim.

4. A tire tool comprising a foot piece having one end adapted to engage a side wall of a tire casing, an elongated handle having a curved lower end portion connected to the foot piece adjacent the point of engagement with the tire casing and extending upwardly from said foot piece at an angle relative thereto, a sleeve-like member slidably mounted upon the handle, and an arm pivotally connected to said sleeve and having means for engagement with the other side wall of said tire casing at a point remote from the point engaged by the end of the foot piece, and said foot piece and means being moved by the handle in opposite directions to free said casing from a tire rim.

RAYMOND A. STUBLER.

REFERENCES CITED

The following references are of record in the file of this patent:

UNITED STATES PATENTS

| Number | Name | Date |
|---|---|---|
| 824,041 | Pilliner | June 19, 1906 |
| 1,001,670 | Morris | Aug. 29, 1911 |
| 1,343,893 | Bjornlie | June 22, 1920 |
| 1,369,770 | Baker | Mar. 1, 1921 |
| 1,472,556 | Dallas | Oct. 30, 1923 |